United States Patent
Sakai et al.

(10) Patent No.: US 6,981,204 B2
(45) Date of Patent: Dec. 27, 2005

(54) PROGRAMMABLE GLITCH FILTER FOR AN ASYNCHRONOUS DATA COMMUNICATION INTERFACE

(75) Inventors: Takeshi Sakai, Richardson, TX (US); Rameshkumar Ravikumar, Plano, TX (US); Mohammad Jahidur Rahman, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 463 days.

(21) Appl. No.: 10/199,723

(22) Filed: Jul. 19, 2002

(65) Prior Publication Data

US 2004/0015774 A1     Jan. 22, 2004

(51) Int. Cl.[7] .................. G06F 11/08; H03M 13/00
(52) U.S. Cl. .............. 714/797; 714/700; 714/709
(58) Field of Search ................ 714/797, 700, 714/709, 798

(56) References Cited

U.S. PATENT DOCUMENTS

| | | | | |
|---|---|---|---|---|
| 4,922,493 A | * | 5/1990 | Kase | .................. 714/747 |
| 5,491,713 A | * | 2/1996 | Kwok et al. | .................. 375/333 |
| 5,905,763 A | * | 5/1999 | Kamikubo | .................. 375/334 |
| 6,731,683 B1 | * | 5/2004 | Fiedler et al. | .................. 375/232 |

* cited by examiner

Primary Examiner—Joseph Torres
(74) Attorney, Agent, or Firm—J. Dennis Moore; W. James Brady, III; Frederick J. Telecky, Jr.

(57) ABSTRACT

An apparatus and a method for filtering glitches in a data communications controller receiving asynchronous input data signals varying between two signal levels representing two bit values and having a predetermined input bit period, and sending output data signals corresponding to the input data signals. Glitches are detected in the input data signals by detecting reversals of signal level having a duration less than the input bit period. A glitch time value corresponding to the glitch duration is determined, and then a sampling clock rate is set at a rate determined from the glitch time value. The input data signals are sampled at the sampling clock rate to generate a sequence of input data samples. A voting number of input data samples are monitored and an output signal is provided, representing the value of a majority of the sequential input data samples.

17 Claims, 4 Drawing Sheets

US 6,981,204 B2

PROGRAMMABLE GLITCH FILTER FOR AN ASYNCHRONOUS DATA COMMUNICATION INTERFACE

TECHNICAL FIELD OF THE INVENTION

This invention relates to asynchronous data communication interface controllers, and more particularly relates to a method and apparatus for detecting and filtering glitches in asynchronous digital signals received by such controllers.

BACKGROUND OF THE INVENTION

In asynchronous transmission, data is coded into a series of pulses, including a start bit, and including a stop bit or a guard band. The start bit is sent by a sending unit to inform a receiving unit that a character is to be sent. The character is then sent, followed by the stop bit or guard band, designating that the transfer of that character is complete. Modes of asynchronous communication are frequently defined in standards that are established by standards setting bodies, such as the American National Standards Institute (ANSI), the International Telecommunications Union (ITU) and the International Organization for Standardization (ISO).

Asynchronous communication is frequently used to transfer data to and from plug-in units, such as modems, memory cards, and the like, that are plugged into host units, such as digital cameras, personal computers, and the like. An interface controller in the host unit manages the asynchronous data communication between the plug-in unit and the host unit. An exemplary asynchronous communication standard is the ISO7816 standard, adopted by the ISO. Plug-in units communicating with an interface controller in a manner that complies with the ISO7816 standard are frequently referred to as Smart Cards, or Integrated Circuit Cards.

FIG. 1 shows a typical Smart Card interface arrangement. A Smart Card unit 10 is electrically connected to a host unit 14 by way of an interface controller 12 in the host unit 14 that manages the transfer of data between the Smart Card unit 10 and the host unit 14. The transfer of data between the host unit 14 and the interface controller 12 is shown by way of example in FIG. 1 as being by way of a PCI bus 16 in the host unit 14. Numerous other means for communicating data between the interface controller and the host unit are possible, including EISA bus, universal serial bus (USB), and so on. The Smart Card connection to the host unit 14 is by way of a two-way serial line 11, which is split in the host unit 14 into a transmitting line 26 and a receiving line 30, using well known techniques. The rate of data exchange between the Smart Card unit 10 and the interface controller 12 is controlled by an interface clock, which can be at one of five different clock frequencies, 4 MHz, 6 MHz, 8 MHz, 12 MHz and 20 MHz.

The interface unit 12 includes a Smart Card interface subunit 18 and a PCI interface subunit 20. The Smart Card interface subunit 18 includes a Smart Card block 22 and a parity checker block 24. The Smart Card block 22 receives the signals transmitted on line 26 by the Smart Card unit 10, recovers the data in those signals, and then sends that data on line 27 to the PCI interface subunit where it is placed on the PCI bus 16 according to the well-known PCI standard protocol, for transmission to other parts (not shown) of the host unit 14. The parity checker block 24 monitors the data on line 26 to detect whether a parity error exists in a character of data. If such a parity error is so detected, the parity checker block 24 asserts a signal on line 28, which causes a gate 29 to block the Smart Card block 22 from receiving the error, and sends a signal on line 30 to the Smart Card unit 10 notifying it of the error, which prompts an attempted re-send of the affected character from the Smart Card unit 10.

When parity errors exist, it is frequently because of errors made in the coding of the data in the Smart Card unit 10. However, sometimes parity errors are detected in the parity checker block 24 because of the occurrence of glitches occurring on the signals sent from the Smart Card unit 10. This problem is not limited to asynchronous data communicated according to the ISO7816 standard, but is a problem with respect to asynchronous data communication generally. Further, it is not limited to systems in which errors are determined by parity checking; rather, it applies to such systems in which errors in the data can occur because of glitches. It would be desirable to be able to be able to successfully detect data in asynchronous communication, even if glitches are present. It would also be desirable to avoid the time expenditure involved in error detecting and signaling, and re-send of data in systems wherein an error detecting and data re-send protocol is provided.

SUMMARY OF THE INVENTION

In accordance with the present invention, an apparatus and a method are provided for filtering glitches in a data communications controller receiving asynchronous input data signals varying between two signal levels representing two bit values and having a predetermined input bit period, and sending output data signals corresponding to the input data signals. The glitches comprise reversals of signal level, having a glitch duration less than the predetermined bit period, on the input data signals. Glitches are detected in the input data signals by detecting reversals of signal level having a predetermined duration less than the predetermined input bit period. A glitch time value corresponding to the glitch duration is determined, and then a sampling clock rate is determined from the glitch time value. The input data signals are sampled at the sampling clock rate to generate a sequence of input data samples. A predetermined voting number of input data samples are monitored and an output signal is provided, representing the value of a majority of the sequential input data samples. Finally, a voting number of subsequent input data samples are monitored and output signals are provided, representing the value of a majority of those subsequent input data samples.

The invention may be utilized in systems with error detection, such as parity check, but is not limited to use in such systems. However, when used in systems with error detection, the inventive glitch filtering may be turned on when a programmable number of errors is detected, but maintained in an off state otherwise.

These and other features of the invention will be apparent to those skilled in the art from the following detailed description of the invention, taken together with the accompanying drawings.

DETAILED DESCRIPTION OF THE PREFERRED EMBODIMENT

The numerous innovative teachings of the present invention will be described with particular reference to the presently preferred exemplary embodiments. However, it should be understood that this class of embodiments provides only a few examples of the many advantageous uses and innovative teachings herein. For example, while the embodiment of the invention described herein is with respect to an ISO7816 standard data interface, it is applicable to any asynchronous data interface. In general, statements made in the specification of the present application do not necessarily delimit the invention, as set forth in different aspects in the various claims appended hereto. Moreover, some statements may apply to some inventive aspects, but not to others.

Figure 2:
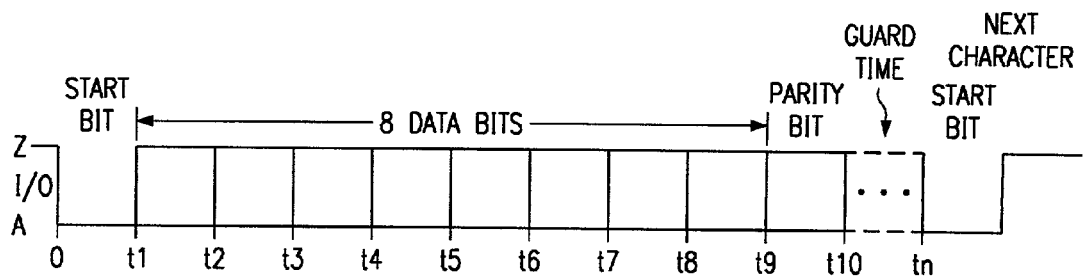
FIG. 2 is a signal timing diagram for a signal complying with the ISO7816 standard.

FIG. 2 is a timing diagram for a signal that is compliant with the ISO7816 standard, with time represented on the horizontal axis. A complete character is shown in the figure, starting at time 0 and ending at time tn. The character is composed of bits, each bit being of a defined duration referred to in the ISO7816 standard as an Elementary Time Unit, or etu. At any given time the signal is at either an A state or a Z state. At the beginning of a character, between time 0 and time t1, a start bit having a value of A is sent, followed by eight data bits between time t1 and time t9. The eight data bits are followed, between time t9 and t10, by a parity bit. The parity bit is followed by a guard time having a variable number of etus duration, between time t10 and the end of the character, time tn. Further details on this and other aspects of the ISO7816 standard can be found in the ISO7816 standard publication, which may be obtained from the International Organization for Standardization at 1, rue de Varembé, Case postale 56, CH-1211 Geneva 20, Switzerland. A basic overview of the ISO7816 standard may be obtained from the Smart Card Industry Association at 191 Clarksville Road, Princeton Junction, N.J. 08550.

Figure 3:
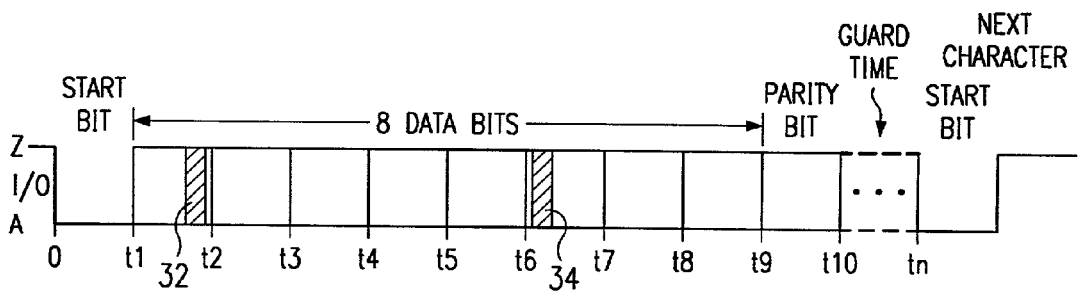
FIG. 3 is a signal timing diagram like that of FIG. 2, and also showing the presence of glitches.

FIG. 3 is a signal timing diagram like that of FIG. 2, but also showing two glitches, at 32 and 34, that appear in the first and sixth data bits, respectively. These glitches take the form of a signal superimposed on the transmitted signal, having a voltage opposite from that of the data bit. Thus, for example, if the first data bit in FIG. 3 has a value of Z, the glitch would be a negative-going pulse that could cause a detector to see a value of A during the glitch. Likewise, if such first data bit has a value of A, the glitch would be a positive-going pulse that could cause a detector to see a value of Z during the glitch.

Glitches are typically less than 0.2 bits in duration. However, if the glitch exists at the time the Smart Card block 22 attempts to resolve the value of the bit, an erroneous detection of the bit value occurs. Generally, there is seldom more than one glitch in a given character, and so a parity error is usually generated by the glitch. Worse, however, if two glitches occur in a given character, no parity error is generated, since the two glitches cancel for the purposes of parity, but corrupted data is transmitted to the host unit.

Figure 1:
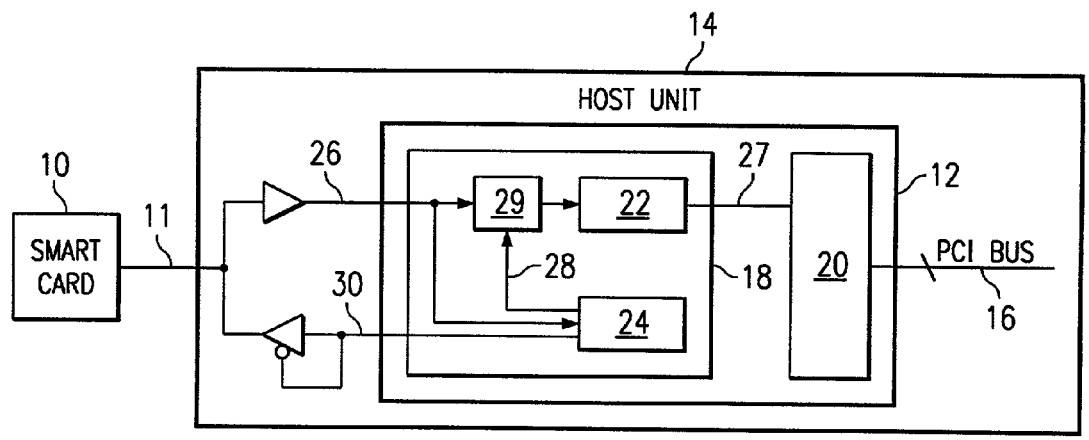
FIG. 1 is a block diagram of a prior art Smart Card-to-PCI bus interface arrangement.
Figure 4:
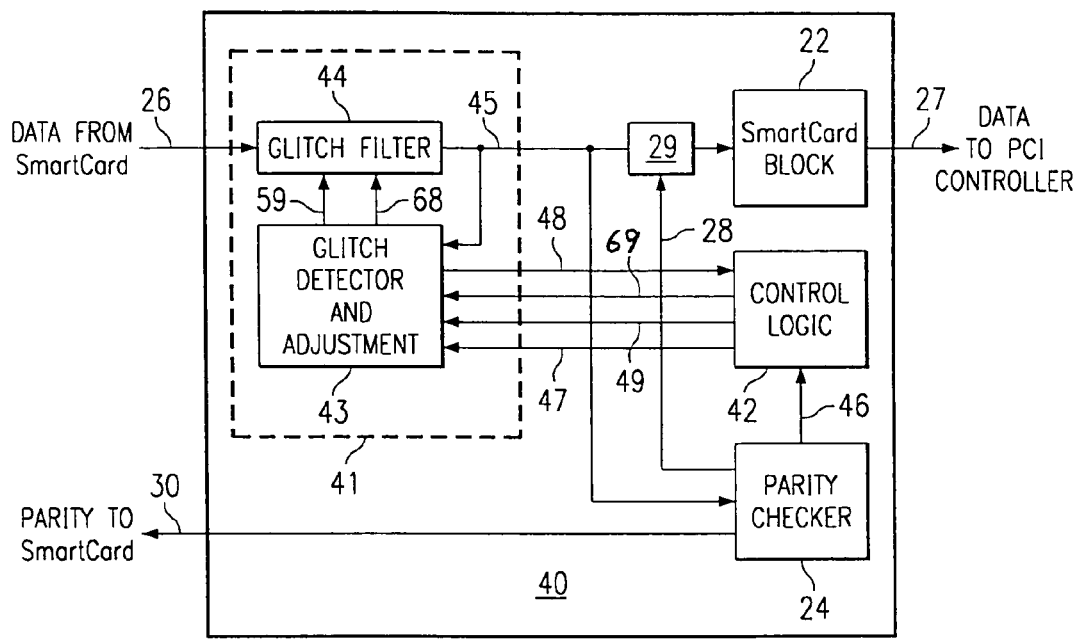
FIG. 4 is a block diagram of a Smart Card interface unit incorporating a preferred embedment of the present invention.

FIG. 4 is a block diagram of a Smart Card interface subunit 40 incorporating a programmable glitch filter 41 in accordance with a preferred embedment of the present invention, a gate 29, a Smart Card block 22, a parity checker block 24, and a control logic block 42. The gate 29, the Smart Card block 22 and the parity checker block 24 may be the same as the same numbered blocks of FIG. 1. The programmable glitch filter 41 and control logic block 42 may be implemented in hardware, firmware or software, as desired. In the preferred embodiment described herein the control logic block 42 is implemented as a microcontroller, such as an 8052 microcontroller, controlled by firmware, while the programmable glitch filter 41 is implemented in hardware.

The programmable glitch filter (PGF) 41 is comprised of a glitch detector and adjustment block (GDA) 43 and a glitch filter 44, interconnected, and connected to logic block 42, Smart Card block 22 and parity checker block 24, as shown. The PGF 41 is generally initialized in an Off state, although it may be programmed to be initialized in an On state. In the Off state, the glitch filter 44 receives signals from a Smart Card unit, provided to the PGF 41 on line 26, and samples those signals at a reference clock rate, for example a system clock rate at 48 MHz, to recover the Smart Card signals. The recovered Smart Card signals are sent to the Smart Card block 22 and to the parity checker block 24 on line 45. As in the prior art, if the parity checker block 24 detects an error, it sends a blocking signal on line 28 to the gate 29, and sends a signal on line 30 to the Smart Card unit. The parity checker block 24 also sends a signal on line 46 to control logic 42, indicating that a parity error has been detected. This can be the same signal as that sent on line 30, inverted if required.

Briefly, after the control logic 42 detects a programmable number of parity errors, it sends a signal on line 47 to the GDA 43, which enables the finding of glitches. The GDA 43 is programmed to detect glitches having a width less than 0.2 etu. When the GDA 43 detects a glitch, it provides a signal to the control logic on line 48. Once the control logic 42 receives this signal, it causes a newly calculated glitch width to be stored, and turns on the glitch filter 44 by asserting an enable bit on line 68. The newly calculated glitch width is provided to the glitch filter 44 on line 59, where it is used to set the sample clock at a frequency that optimizes glitch filtering, described in detail below.

In this way, glitches are detected, and the width of the latest detected glitch is used to set the sample clock, thus providing advantageous adaptive glitch detection and filtering, maximizing the detecting and filtering of glitches in an environment where glitch widths may be varying over time. The operation of PGF 41 is described in detail below.

Figure 5:
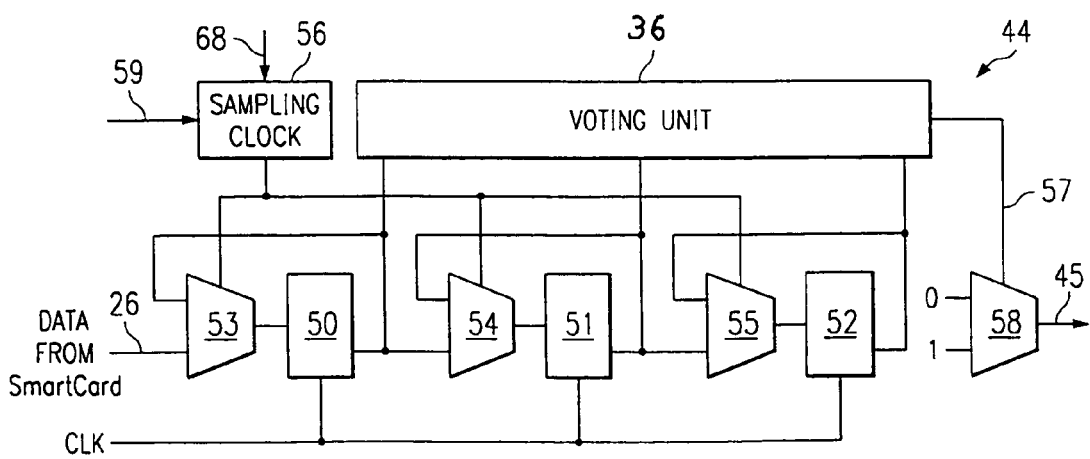
FIG. 5 is a block diagram of the glitch filter of FIG. 4.

FIG. 5 shows a detailed diagram of the glitch filter 44. A three-bit shift register is provided, comprising, for example, three latches 50, 51, 52, connected in series, as shown. Three two-input multiplexers 53, 54, 55, are also provided in series with the multiplexers 53, 54, 55, for a data hold function described in detail below. The data from a Smart Card on line 26 is provided to one input of multiplexer (MUX) 53. The output of MUX 53 is provided to the data input of latch 50. The output of latch 50 is provided to one input of MUX 54, as well as to the other input of MUX 53, and to a first input of a three-input voting unit 36. Likewise, the output of MUX 54 is provided to the data input of latch 51, and the output of latch 51 is provided to one input of MUX 55, as well as to the other input of MUX 54, and to a second input of three-input voting unit 36. The output of MUX 55 is provided to the data input of latch 52, and the output of latch 52 is provided to the other input of MUX 55, and to a third input of three-input voting unit 36.

The output of a sampling clock generator 56 is provided to the control input of MUXes 53, 54 and 55. Each of latches 50, 51 and 52, of the three-bit shift register is clocked by a reference clock, which in this embodiment is a system clock, CLK, e.g., at 48 MHz. A results output of voting unit 36 is provided to the control input of a MUX 58 on line 57. The two inputs of MUX 58 are held to a 0 and to a 1, respectively. The output of MUX 58 is provided to line 45.

Note that while the latches 50, 51 and 52, are clocked by the system clock CLK, the MUXes 53, 54 and 55, are strobed by the output of sampling clock generator 56. Thus, the contents of the latches 50, 51 and 52 are controlled by the sampling clock generator 56, since the contents of each latch is simply circulated, i.e., held, unless a sample clock is asserted. The sampling clock generator 56 receives an input on line 59 from the GDA 43 (FIG. 4), while the voting unit 36 receives an enable signal on line 68 from the GDA 43.

The voting unit 36 is an unclocked block of logic that provides an output that is the result of a two-out-of-three "vote," i.e., according to the following table:

TABLE 1

| Input Values | Output Value |
|---|---|
| 0, 0, 0 | 0 |
| 1, 0, 0 | 0 |
| 0, 1, 0 | 0 |
| 0, 0, 1 | 0 |
| 1, 1, 0 | 1 |
| 0, 1, 1 | 1 |
| 1, 0, 1 | 1 |
| 1, 1, 1 | 1 |

In operation, when not enabled for glitch filtering, the sampling clock generator 56 is simply set to the CLK rate. This is controlled by the filter enable signal on line 68. Thus, when the filter enable signal is not asserted (i.e., signaling disable) the sampling clock generator 56 is forced to output the sampling clock at the CLK rate. In this mode, as the samples are sensed by the voting unit 36, it controls MUX 58 to provide a 0 or 1, thereby recovering the data from the signals on line 26. Any but extremely short glitches (<~50 picoseconds) will result in multiple samples, which will be sensed by the voting unit 36 and thus appear at the output of MUX 58, i.e, on line 45 in the recovered data.

However, when glitch filter 46 is enabled for glitch filtering, the latest glitch width setting is provided from the GDA 43 is provided on line 59, and stored in the sampling clock generator 56, and the enable signal is asserted on line 68. The sampling clock generator 56 provides the sampling clock to the control input of MUXes 53, 54 and 55, at a frequency corresponding to that stored value, as described below. The three latches 50, 51, 52, continue to be clocked at the CLK rate. However, as mentioned above, the MUXes 53, 54 and 55, are strobed at the sampling clock rate, and thus shift data samples in sequence through the latches 50, 51, 52, at that rate. The frequency of the sampling clock is set to optimize glitch filtering, for example corresponding to approximately the frequency of a square wave signal having a period equal to the width of the detected glitch. As a result, for glitches approximately the width of the detected glitch, or smaller, the data value represented by that glitch will appear at most in only one of the three latches 50, 51, 52, while the proper data value will appear in the other two latches.

The voting unit 36 outputs on line 57 a results value corresponding to the data value in at least two of the three latches 50, 51, 52, as described above. Thus, even if a glitch is propagated through the latches 50, 51, 52, the voting unit ignores it and controls MUX 58 to output the proper value. Note that a larger number of latches could be provided, and a majority vote taken on their outputs, but three latches is considered preferred. If a larger number of latches is used, the number is preferably odd, to ensure an unambiguous vote. Also note that the manner in which the sequential samples are stored for the voting process is a matter of design choice and is not limited to latches; it is only necessary to store them in some way so that they can be examined simultaneously for the voting process.

Figure 6:
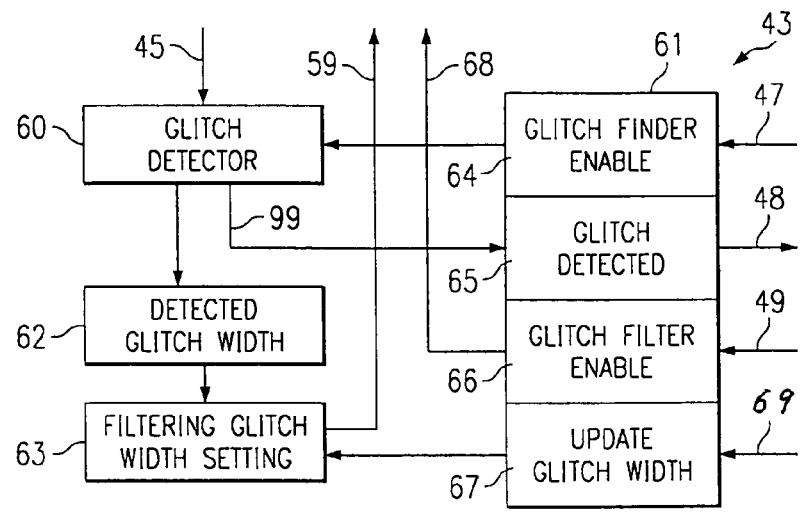
FIG. 6 is a block diagram of the glitch detector and adjustment block of FIG. 4.

FIG. 6 is a block diagram of the GDA block 43 of FIG. 4. The GDA block 43 includes a glitch detector 60, a glitch control register block 61, a detected glitch width register 62, and a filtering glitch width setting register 63. The glitch control register block 61 includes a one-bit glitch finder enable register 64, a one-bit glitch detected register 65, a one-bit glitch filter enable register 66, and a one-bit update glitch width register 67. The glitch detector 60 receives the samples on line 45 from the glitch filter 44 (FIG. 5). When glitch detector 60 detects a glitch it sets the bit in glitch detected register 65 to a 1, using line 99, and stores a value corresponding to the width of the detected glitch in detected glitch width register 62. The value stored in the filtering glitch width setting register 63 is provided on line 59, for provision to the sampling clock generator 56 in the glitch filter 44. The glitch finder enable register 64 receives a glitch finder enable signal from control logic 42 (FIG. 4) on line 47. The glitch detected register 65 provides the bit value stored therein to control logic 42 on line 48. The glitch filter enable register 66 receives a glitch filter enable signal from control logic 42 on line 49. The update glitch width register 67 receives an update glitch width signal from control logic 42 on line 69.

In operation, after the control logic 42 detects a programmable number of parity errors, it sends a signal on line 47 to the GDA 43, setting the bit in the glitch finder enable register 64 to a 1, which enables the finding of glitches by glitch detector 60 in the signals provided on line 45. The GDA 43 is preferably programmed to detect glitches having a width less than 0.2 etu, although selection of the width is a matter of design choice. When the glitch detector 60 detects a glitch, it sets the bit in the glitch detected register 65 to a 1. At the same time, it calculates the glitch width by counting the number of interface clock periods between the beginning edge and ending edge of the glitch, and stores that calculated value in the detected glitch width register 62, overwriting any default value previously stored therein.

Figure 8:
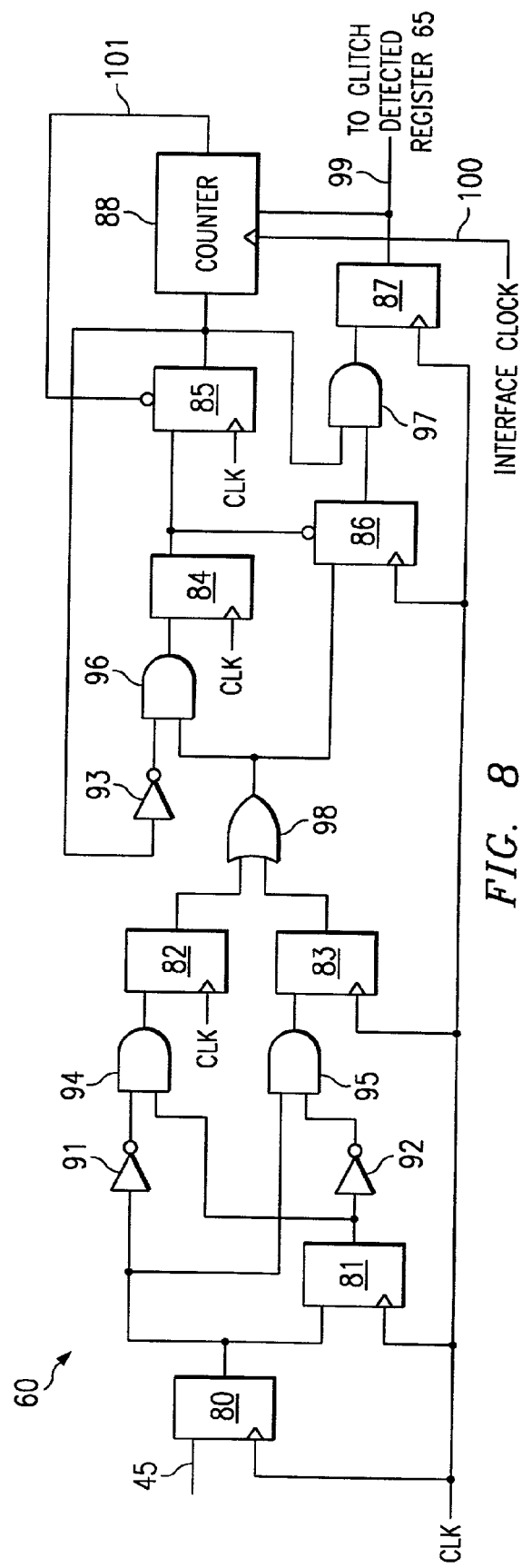
FIG. 8 is a block diagram of the glitch detector of FIG. 6.

The glitch detector 60 of FIG. 6 can be any logic that detects pulses and determines the time between a rising and a falling edge of the pulse. FIG. 8 shows a preferred embodiment of glitch detector 60 in which the rising and falling edges of pulses on line 45 are detected, and a count is made of interface clock periods between them. It includes flip-flops 80–87, counter 88, inverters 91–93, AND gates 94–97, and OR gate 98, interconnected as shown. All of the flip-flops 80–87 are clocked by CLK, i.e., at 48 MHz, but the counter 88, under control of the interface clock provided on line 100, counts at the interface clock rate. It will be recalled that the rate of data exchange between the Smart Card unit 10 and the interface controller 12 is controlled by an interface clock, which can be at one of five different clock frequencies, 4 MHz, 6 MHz, 8 MHz, 12 MHz and 20 MHz.

In operation, the output of flip-flop 82 goes to 1 when the glitch detector 60 detects a falling edge, e.g., the start of a negative glitch. On the other hand, the output of flip-flop 83 goes to a 1 when the glitch detector 60 detects a rising edge, e.g., the start of a positive glitch. The output of flip-flop 84 goes to a 1 when the first falling or rising edge is detected. This sets the output of flip-flop 85 to a 1, which starts the counter 88 counting interface clock periods. The output of flip-flop 86 is set to a 1 only when the end of a glitch, i.e., the second edge, is detected. This sets the output of flip-flop 87, i.e., line 99, to a 1, which causes the counter 88 to stop counting, and sets the bit in glitch detected register 65 (FIG. 6) to a 1. Counter 88 is 15 bits wide, which is sufficient to catch the glitches it is desired to detect. The value in the counter is the value in the detected glitch width register 62. Counter 88 may serve as the detected glitch width register 62, in which case the final count value, when line 99 goes to a 1, is read directly from it, or a separate register may be provided as the detected glitch width register, in which case the final count is loaded into the separate register. If counter 88 counts to its highest count, e.g., $2^{15}-1$, a signal is asserted on line 101, which is connected to the reset input of flip-flop 85, thus resetting flip-flop 85.

The value of the bit in glitch detected register 65 is provided to the control logic 42 on line 48. Once the control logic 42 reads the value of 1 on line 48 it clears the glitch detected register 65. At the same time, the control logic 42, using line 69, sets the bit in the update glitch width register 67 to a 1, which causes the newly calculated glitch width to be read from glitch detected register 62, converted into system clock periods and stored in the filtering glitch width setting register 63. At the same time, the control logic 42 turns on the glitch filter 44 (FIG. 5) by setting the bit in the glitch filter enable register 66 to 1. The value in the glitch filter enable register 66 is provided to the glitch filter 44 on line 68, as described above.

It will be recalled that the value in the filtering glitch width setting register 63 is provided on line 59 to the glitch filter 44, where it is used to set the sample clock. The sample clock is derived from the system clock, and so the value stored in the filtering glitch width setting register is also in system clock periods in order to simplify the sample clock setting. To optimize glitch filtering, the frequency of the sampling clock is preferably set to the frequency of an oscillating signal having a period equal to the width of the detected glitch, i.e., the value in the filtering glitch width setting register 63. Basically:

$$F_s \leq 1/(P_{sys} \cdot W_d), \quad \text{Equation (1)}$$

where $F_s$ is the sampling frequency, $P_{sys}$ is the period of one cycle of the system clock, and $W_d$ is the value in the filtering glitch width setting register 63, converted to system clock periods. The "less than or equal to" symbol is used in order to indicate that an optional guard time may be provided in setting the sampling frequency, in order to ensure that the sampling is optimized. Since the embodiment described herein updates the glitch width on an ongoing basis, providing a guard time is not considered necessary. However, a designer may wish to provide such a guard time if, for example, glitch widths could be varying considerably between adjacent glitches.

The guard time may be provided as follows. Assuming the counter 88 counts at the interface clock frequency, this is accomplished by determining a $W_{ds}$:

$$W_{ds} = (\text{COUNT} \cdot F_{sys} \cdot \text{GUARD})/F_{IC} \quad \text{Equation (2)}$$

where $W_{ds}$ is the glitch width in system clock periods, COUNT is the final count value in counter 88 (i.e., in detected glitch width register 62), $F_{sys}$ is the system clock frequency, GUARD is a factor selected to provide a desired guard time and $F_{IC}$ is the interface clock frequency. Thus, for example, say the counter 88 has a final count value of 4, the system clock frequency is 48 MHz, the interface clock frequency is 6 MHz, and GUARD has a value of 1, i.e, no extra guard time is selected. Then:

$$W_d = (4 \cdot 48 \cdot 1)/6$$
$$= 32.$$

Therefore, by Equation (1):

$$F_s = 48 \text{ MHz}/32$$
$$= 1.5 \text{ MHz}.$$

Now, if a guard time were desired, the sampling frequency would be decreased by the factor GUARD. In the above example, say the factor GUARD were selected to be equal to 1.1, then the sampling frequency would change from 1.5 MHz to 1.37 MHz. The resulting extra time in the sampling frequency period would provide the desired guard time.

Preferably, an initial default value is provided in the detected glitch width register 62, of 2 $\mu$s. This is because it is believed that most glitches that are present on signals from Smart Cards are less than 2 $\mu$s wide. With such an initial default value, the control logic 42 could be programmed in a first mode, for example, to enable the glitch filter 44 by simply setting the bit in the glitch filter enable register 66 to a 1. There would then not be a need to set the bit in the glitch finder enable register 64 and then do the above-described calculations to find the glitch width. However, the control logic 42 could be programmed to switch to a second mode, in which the full operation, including glitch width calculation, all as described above, is followed, if the parity checker 24 continued to report more parity errors.

After detection of the first glitch, and the steps described above are taken, the glitch detector 60 continues to monitor the signals on line 45. Operation is the same as described above, only instead of overwriting an initial default value in the detected glitch width register 62, the previously calculated value is overwritten. Also, there is no need to re-set the bit in the glitch finder enable register 64.

Figure 7:
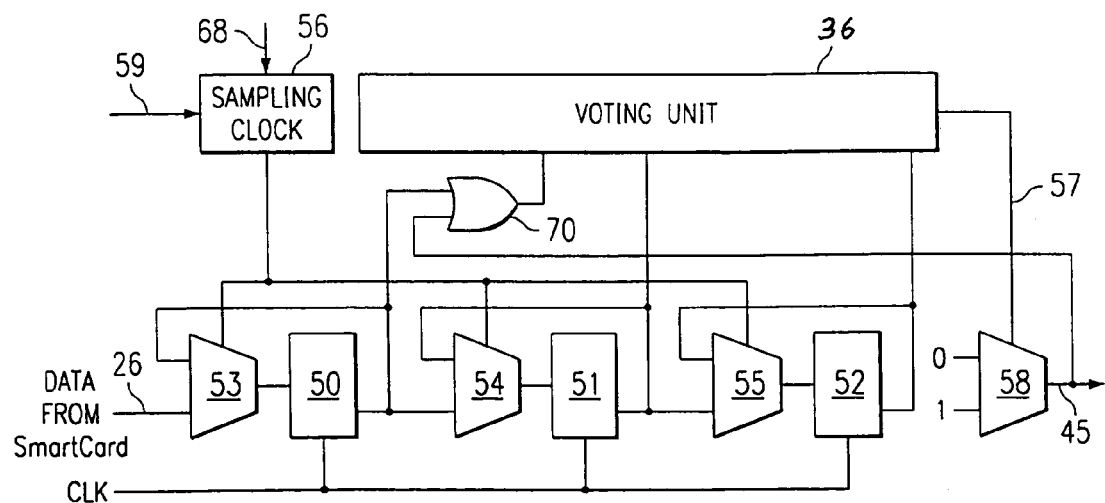
FIG. 7 is a block diagram of a glitch filter like that of FIG. 5, but also including an optional hysteresis function.

Advantageously, a hysteresis function may be provided in implementations of the present invention, if desired. By hysteresis function it is meant that the system is adapted to prevent toggling due to glitches at the end of bits. Referring now to FIG. 7, an implementation to provide this function is shown. This figure is similar to FIG. 5, but has an OR gate 70 added, in a feedback path from the output of the MUX 58, with the other input being the output of latch 50, and the output of OR gate 70 being an input to voting unit 36.

Although the present invention and its advantages have been described in detail, it should be understood that various changes, substitutions and alterations can be made herein without departing from the spirit and scope of the invention as defined by the appended claims.

What is claimed is:

1. In a data communications controller receiving asynchronous input data signals comprised of bits having a duration and varying between two signal levels representing two bit values and having a predetermined input bit period, and sending output data signals corresponding to the input data signals, a method for filtering glitches, comprising reversals of signal level superimposed on the input data signals as transmitted and having a glitch duration less than the predetermined bit period, on the input data signals, comprising the steps of:

detecting glitches in the input data signals by detecting reversals of signal level during the duration of the bits and having a predetermined duration less than the predetermined input bit period;

determining a glitch time value corresponding to the glitch duration;

setting a sampling clock rate at a rate determined from the glitch time value;

sampling the input data signals at the sampling clock rate to generate a sequence of input data samples;

monitoring a predetermined voting number of input data samples and providing an output signal representing the value of a majority of the samples in the sequence of input data samples; and monitoring a voting number of subsequent input data samples and providing an output signal representing the value of a majority of those subsequent input data samples.

2. A method as in claim 1 wherein the predetermined duration is 0.2 times the input bit period.

3. A method as in claim 1 wherein a reference clock is provided, having a reference clock period, and wherein:

the step of determining a glitch time value is performed by determining a count of reference clock periods during a glitch; and the step of setting a sampling clock rate is performed by setting the rate at the value $1/(P_{sys} \cdot W_d)$, where $P_{sys}$ is the period of one cycle of the reference clock, and $W_d$ is the count of reference clock periods during a glitch.

4. A method as in claim 1 wherein the step of determining a sampling clock rate is performed by setting the sampling clock rate at the frequency of an oscillating signal having a period equal to the glitch duration.

5. A method as in claim 1, wherein the step of monitoring a predetermined voting number of input data samples is performed by monitoring a predetermined sequential voting number of input data samples.

6. A method as in claim 5, wherein the step of monitoring a predetermined voting number of input data samples is performed by monitoring three sequential input data samples.

7. A method as in claim 1, further comprising the step of monitoring errors in the in put data signals, and wherein the step of detecting glitches is initiated when a predetermined number of errors are detected.

8. A method as in claim 7, wherein the step of monitoring errors is performed by performing a parity check on data values recovered from the input data signals, and wherein the step of detecting glitches is initiated when a predetermined number of parity errors are detected.

9. A method as in claim 1, wherein the step of detecting glitches is performed by detecting reversals of the level of the output signal.

10. A programmable glitch filter unit, for filtering glitches from asynchronous data signals comprised of bits having a duration and provided as an input to the programmable glitch filter unit, the asynchronous data signals varying between two signal levels representing two bit values and having a predetermined input bit period, and for sending output data signals corresponding to the input data signals, the glitches comprising reversals of signal level superimposed on the input data signals as transmitted and, having a glitch duration less than the predetermined input bit period, on the asynchronous data signals, comprising:

a glitch detector adapted to detect reversals of level of the asynchronous data signals during the duration of the bits and having a predetermined duration less than the predetermined bit period, and to determine a glitch time value corresponding to the glitch duration; and a glitch filter adapted to sample the asynchronous data signals at a sampling clock rate determined from the glitch time value to provide input data samples, and to provide an output signal representing the value of a majority of the input data samples.

11. A programmable glitch filter unit according to claim 10, wherein the predetermined duration is 0.2 times the input bit period.

12. A programmable glitch filter unit according to claim 10, wherein a reference clock is provided, having a reference clock period, and wherein the glitch detector is adapted to:

determine the glitch time value by determining a count of reference clock periods during a glitch; and set the sampling clock rate setting the rate at the value $1/(P_{sys} \cdot W_d)$, where $P_{sys}$ is the period of one cycle of the reference clock, and $W_d$ is the count of reference clock periods during a glitch.

13. A programmable glitch filter unit according to claim 10, wherein the glitch detector is adapted to set the sampling clock rate at the frequency of an oscillating signal having a period equal to the glitch duration.

14. A programmable glitch filter unit according to claim 10, wherein the glitch filter comprises:

a shift register having a predetermined odd number of bit positions, for receiving the input data samples and shifting them therethrough;

a sampling clock generator generating a sampling clock at the sampling clock rate and controlling the rate of shifting of input data samples through the shift register; and a voting unit that provides an output signal corresponding to the level of a majority of input data samples in the shift register.

15. A programmable glitch filter unit as in claim 14, wherein the shift register has three bit positions.

16. A programmable glitch filter unit as in claim 10, further comprising:

an error detector adapted to monitor errors in the asynchronous data signals; and a filter control responsive to the error detector to enable the glitch filter when a predetermined number of errors are detected.

17. A programmable glitch filter unit as in claim 16, wherein the error detector comprises a parity checker, and wherein the filter control is adapted to enable the glitch filter when a predetermined number of parity errors are detected.

\* \* \* \* \*